(12) United States Patent  
Tawata

(10) Patent No.: US 12,458,992 B2
(45) Date of Patent: Nov. 4, 2025

(54) PAINTING ROBOT AND PAINTING METHOD USING PAINTING ROBOT

(71) Applicant: ABB Schweiz AG, Baden (CH)

(72) Inventor: Takahiro Tawata, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/756,571

(22) PCT Filed: Jun. 18, 2020

(86) PCT No.: PCT/JP2020/023970
§ 371 (c)(1),
(2) Date: May 27, 2022

(87) PCT Pub. No.: WO2021/255896
PCT Pub. Date: Dec. 23, 2021

(65) Prior Publication Data
US 2023/0100988 A1    Mar. 30, 2023

(51) Int. Cl.
*B05B 12/12*    (2006.01)
*B05B 1/14*    (2006.01)
(Continued)

(52) U.S. Cl.
CPC ............ *B05B 13/0431* (2013.01); *B05B 1/14* (2013.01); *B05B 12/124* (2013.01); *B25J 9/1666* (2013.01); *B25J 11/0075* (2013.01)

(58) Field of Classification Search
None
See application file for complete search history.

(56) References Cited

U.S. PATENT DOCUMENTS 9,527,275 B1 * 12/2016 Flannigan ............... B41J 25/308
2009/0102879 A1 * 4/2009 Katada ................. B41J 2/17513
347/85
(Continued)

FOREIGN PATENT DOCUMENTS

CN      109308370 A     7/2023
EP       2641661 A1     5/2016
(Continued)

OTHER PUBLICATIONS

Chinese Office Action, App. No. 202080073257.3, dated Mar. 28, 2023, 9 pages, China National Intellectual Property Association, China.

(Continued)

*Primary Examiner* — Charles Capozzi
(74) *Attorney, Agent, or Firm* — GREENBERG TRAURIG, LLP

(57) ABSTRACT

The present disclosure provides a painting robot and a painting method using the painting robot. The painting robot includes: an arm control unit which controls operation of the robot arm; a head control unit which controls driving of nozzles of the nozzle head; a distance measuring device which measures the distance between the painting portions and the nozzle discharging surface; and an image processing portion which forms a three-dimensional model for painting, which is a three-dimensional model, based on the painting coverage of the vehicle expected to be painted. The head control unit, based on the distances measured between the painting portions in the three-dimensional model for painting and an imaginary nozzle head or the distances measured by distance measuring device, controls to discharge paint from nozzles with distances within the prescribed range, and to not discharge paint from nozzles outside the prescribed range.

18 Claims, 14 Drawing Sheets

(51) Int. Cl.
*B05B 13/04* (2006.01)
*B25J 9/16* (2006.01)
*B25J 11/00* (2006.01)

(56) References Cited

U.S. PATENT DOCUMENTS

| | | | |
|---|---|---|---|
| 2010/0245494 A1* | 9/2010 | Inoue | B41J 2/515 347/85 |
| 2010/0304009 A1 | 12/2010 | Bausen | |
| 2012/0325142 A1* | 12/2012 | Takahashi | B05B 13/0452 901/29 |
| 2013/0314460 A1 | 11/2013 | Orr | |
| 2014/0076985 A1* | 3/2014 | Pettersson | B05B 13/04 239/11 |
| 2014/0374503 A1* | 12/2014 | Yoshimura | B05B 17/0607 239/102.2 |
| 2017/0341098 A1 | 11/2017 | Fritz et al. | |
| 2018/0250955 A1 | 9/2018 | Herre et al. | |
| 2019/0091712 A1 | 3/2019 | Medard et al. | |
| 2019/0193421 A1 | 6/2019 | Herre et al. | |
| 2019/0337311 A1 | 11/2019 | Fritz et al. | |
| 2020/0094282 A1* | 3/2020 | Fritz | B05B 12/04 |

FOREIGN PATENT DOCUMENTS

| | | |
|---|---|---|
| JP | H07168617 A | 7/1995 |
| JP | H10264060 A | 10/1998 |
| JP | H11165406 A | 6/1999 |
| JP | 2001239653 A | 9/2001 |
| JP | 2011-514234 A | 5/2011 |
| JP | 2012-506305 A | 3/2012 |
| JP | 2016-215438 A | 12/2016 |
| JP | 2017-154135 A | 9/2017 |
| JP | 2018-502702 A | 2/2018 |
| JP | 2019077142 A | 3/2022 |
| WO | 2006026240 A1 | 3/2006 |
| WO | 2009088864 A1 | 7/2009 |
| WO | 2018108570 A1 | 6/2018 |
| WO | 2018108572 A1 | 6/2018 |
| WO | 2021205537 A1 | 10/2021 |

OTHER PUBLICATIONS

International Search Report and Written Opinion, issued by the ISA/JP Japan Patent Office, regarding corresponding patent application Serial No. PCT/JP2020/023970; dated Aug. 25, 2020; 10 pages (with English ISR).

* cited by examiner

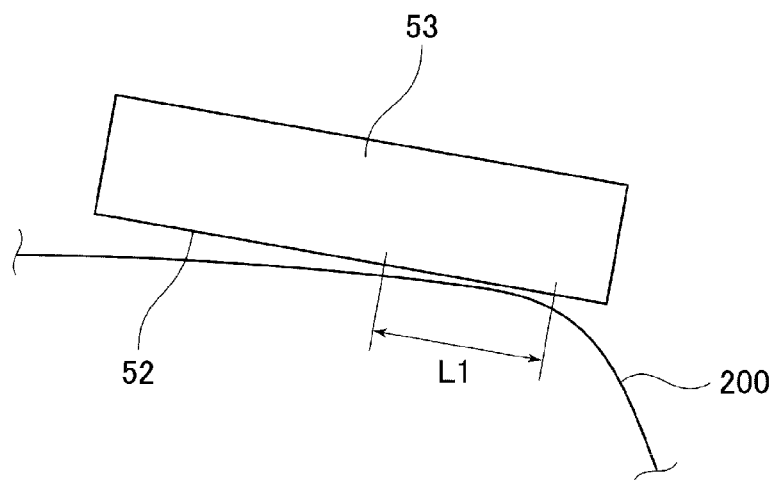
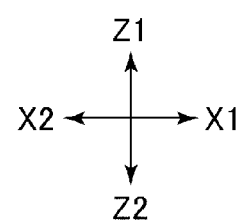
FIG. 13

PAINTING ROBOT AND PAINTING METHOD USING PAINTING ROBOT

CROSS-REFERENCE TO RELATED APPLICATIONS

This is a national stage application which claims priority to International patent application Serial No.: PCT/JP2020/023970, filed on Jun. 18, 2020; and which is herein incorporated by reference in its entirety.

FIELD

The disclosure relates to a painting robot and a painting method using painting robot.

BACKGROUND

In painting lines of automobiles and other vehicles, robot painting using painting robots has become the mainstream. In such robot painting, a painting robot (rotary atomizing type painting machine) in which a rotary atomizing type painting head mounted at the tip of a multi joint robot is used. A technology of mounting an ink-jet type painting head to the painting robot to paint a vehicle is proposed. Such a painting robot is shown in for example Patent Literature 1. Patent Literature 1 discloses painting a vehicle using a long strip painting head.

CITATION LIST

Patent Literature

Patent Literature 1: JP2018-502702A

SUMMARY

Technical Problem

Meanwhile, a vehicle as the painting object has many parts with curved surfaces, and some of them have relatively large curvature. Therefore, when painting the above-mentioned parts with relatively large curvature, if the long-direction center of the painting head is taken as the reference, the distance between the two end sides of the painting head and the vehicle may increase, thus reducing the paint quality. In addition, if the distance between a portion of the painting object and the painting head increase, for example, tiny paint droplets will fly, which may cause waste of paint.

In addition, in vehicles, there are also some portions, in particular such as pillars, that are almost have no width (thin) but have a large curvature. For such thin parts of large curvature such as pillars, it is also necessary to apply the painting appropriately.

Given the above-mentioned situation, the present disclosure has been made to provide a painting robot and a painting method using a painting robot, which can apply painting appropriately even to portions with large curvature to improve the painting quality and reduce waste of paint.

Solution to Problem

In order to solve the above problems, according to a first perspective of the present disclosure, it provides a painting robot configured to discharge paint towards a painting object from a nozzle to perform painting, which is characterized by including: a nozzle head in which a plurality of nozzles are arranged in a predetermined direction; a robot arm with a tip portion to which the nozzle head can be mounted and the mounted nozzle head being movable with the robot arm; an arm control unit which controls operation of the robot arm; a head control unit which controls driving of the nozzles of the nozzle head; a distance measuring device which measures the distance between the painting portion of a vehicle or a vehicle component and the nozzle discharging surface of the nozzle head; and an image processing portion which forms a three-dimensional model for painting, which is a three-dimensional model, based on the painting coverage of the vehicle or the vehicle component expected to be painted. Then, in a state where the operation of the robot arm is being controlled by the arm control unit, the head control unit controls to discharge paint from nozzles with distances within a prescribed range, and controls to not discharge paint from nozzles outside the prescribed range, based on the distances measured between the painting portions in the three-dimensional model for painting and an imaginary nozzle head for the three-dimensional model for painting or the distances measured by the distance measuring device.

In addition, in the above-mentioned disclosure, the nozzle head is mounted on a mounting structure which is mounted on the tip side of the robot arm, and a distance measuring device is mounted on the mounting structure on one side of the main scanning direction when painting by the nozzle head.

In addition, in the above-mentioned disclosure, it is preferable that, the arm control unit and the head control unit perform control based on robot teaching, and in the robot teaching, the arm control unit creates a painting path which is the scanning path when painting, based on the painting portions in the three-dimensional model for painting or the painting portions in the vehicle or the vehicle component, and in the robot teaching, the arm control unit creates posture data in the painting path for the nozzle head to be at a prescribed inclination angle at positions in the painting path, and in the robot teaching, the head control unit prescribes a paint discharge coverage, which is a coverage in which paint is discharged, in the direction orthogonal to the main scanning direction in which the nozzle head scans, based on the painting path and posture data.

In addition, in the above-mentioned disclosure, it is preferable that, when painting on the vehicle or the vehicle component after the robot teaching, based on the detection of the vehicle or the vehicle component by a position detection sensor which detects the position of the vehicle or the vehicle component and the distance measuring device, the arm control unit corrects at least one of the painting path, the posture data and the paint discharge coverage created in the robot teaching while controlling the robot arm.

In addition, in order to solve the above problems, according to a second perspective of the present disclosure, a painting method using a painting robot configured to discharge paint towards a painting object from a nozzle to perform painting, the painting robot is characterized by including: a nozzle head in which a plurality of nozzles are arranged in a predetermined direction; a robot arm with a tip portion to which the nozzle head can be mounted and the mounted nozzle head being movable with the robot arm; a distance measuring device which measures the distance between the painting portion of a vehicle or a vehicle component and the nozzle discharging surface of the nozzle head; and an image processing portion which forms a three-dimensional model for painting, which is configured to control the driving of the nozzle head by the head control unit, based on the painting coverage of the vehicle or the vehicle component expected to be painted, wherein the method includes: an arm operation step in which the robot arm is operated; and in the arm operation step, a partial discharge step in which, based on the distances measured between the painting portions in the three-dimensional model for painting and an imaginary nozzle head for the three-dimensional model for painting or the distances measured by the distance measuring device, control is performed to discharge the paint from the nozzles with the distances within a prescribed range, and to not discharge the paint from the nozzles outside the prescribed range.

Advantageous Effects

According to the present disclosure, it is possible to provide a painting robot and a painting method using the painting robot, which can apply painting appropriately even to portions with large curvature to improve the painting quality and reduce waste of paint.

DESCRIPTION OF DRAWINGS

FIG. 13 is a schematic diagram showing an image of a paint discharge coverage of the nozzle head.

DETAILED DESCRIPTION OF EMBODIMENTS

Hereinafter, painting robots and painting methods using painting robots of the embodiments of the present disclosure are described with reference to the drawings. Further, in the following description, XYZ orthogonal coordinate system may be used for description. Among those, X direction is set to the long direction of the nozzle discharging surface 52 (nozzle head 53), the X1 side is the right side in FIG. 3, and the X2 side is the left side in FIG. 3. In addition, Y direction is set to the short direction (width direction) of the nozzle discharging surface 52 (nozzle head 53), the Y1 side is the upper side of the paper surface in FIG. 3, and the Y2 side is the lower side of the paper surface in FIG. 3. In addition, Z direction is a direction perpendicular to the nozzle discharging surface 52 in FIG. 9, the Z1 side refers to the side away from the painting object (vehicle 200), and the Z2 side is the side close to the painting object (vehicle 200) opposite to the Z1 side.

The painting robot and painting method using a painting robot according to the present embodiment "paints" a painting object, such as a vehicle or a vehicle part (hereinafter, a vehicle part that is a part of a vehicle is also described as a vehicle), which is located in a painting line of an automobile manufacturing plant, and it is aimed at forming a painting film on the surface of the painting object, providing its surface with protection and aesthetics. Therefore, it is necessary to paint approaching vehicles moving along the painting line every prescribed time with desired painting quality within a certain time period.

In addition, in the painting robot and painting method using a painting robot of the present embodiment, not only the above-mentioned painting film can be formed, but also various designs and images can be formed on painting objects such as vehicles and vehicle parts.

(1-1. Overall Configuration of the Painting Robot)

Figure 1:
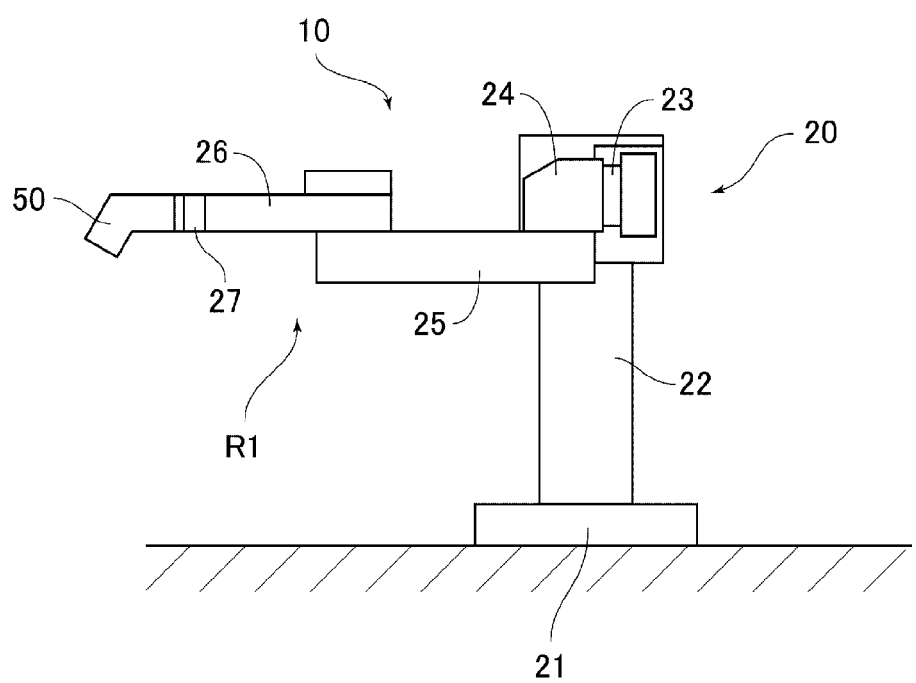
FIG. 1 is a schematic diagram showing the overall configuration of a painting robot according to an embodiment of the present disclosure.
Figure 2:
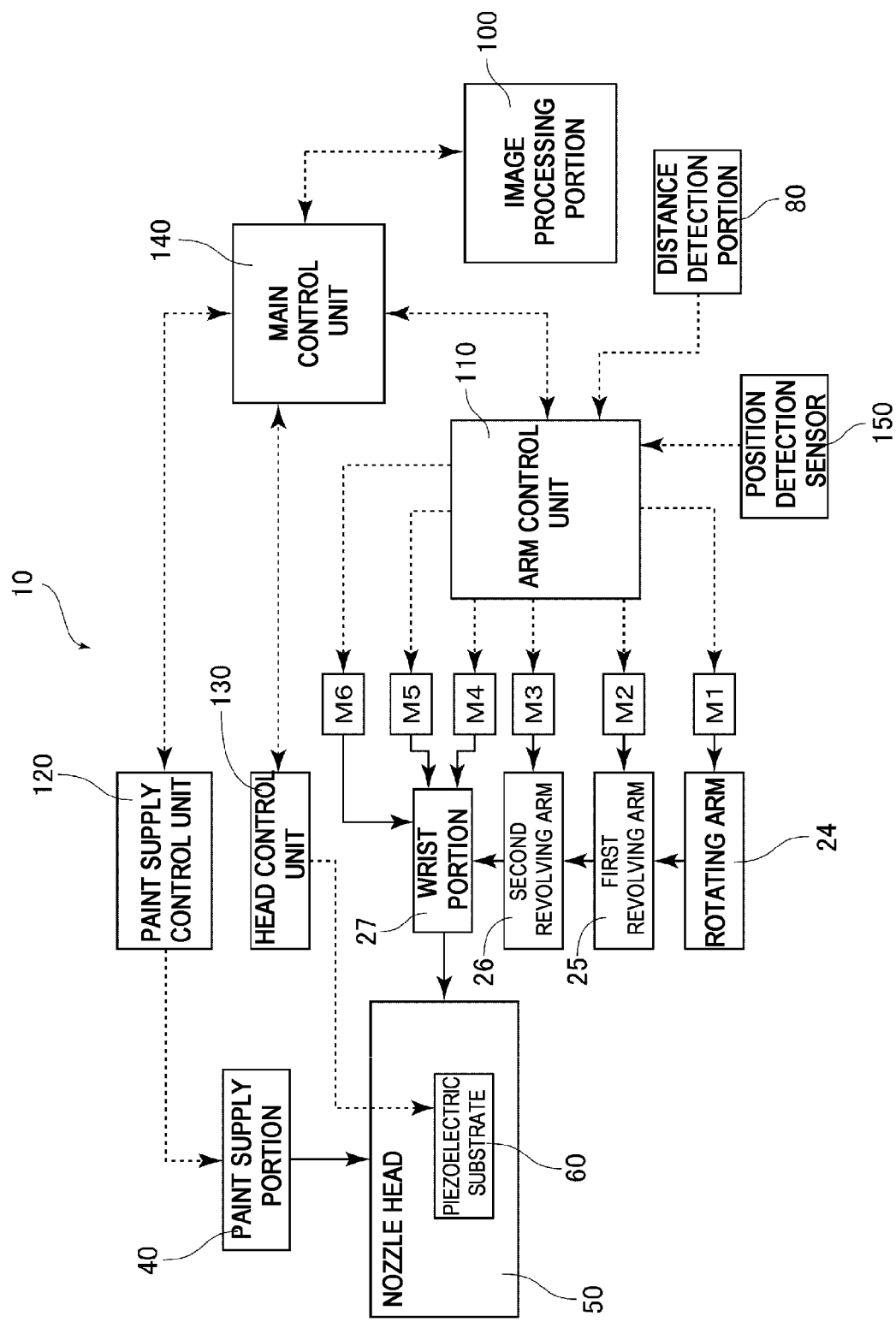
FIG. 2 shows a schematic configuration of the painting robot shown in FIG. 1.

FIG. 1 is a schematic diagram showing the overall configuration of a painting robot 10 according to the first embodiment of the present disclosure. FIG. 2 shows a schematic configuration of the painting robot 10. As shown in FIGS. 1 and 2, the painting robot 10 includes a robot body 20, a paint supply portion 40 and a nozzle head unit 50. Further, the painting robot 10 of the present embodiment is a vertical multi-joint robot suitable for painting curved surfaces. However, if the painting robot 10 can paint curved surfaces, it may be a horizontal multi-joint robot, a rectangular coordinate robots or a combination thereof with a rotating shaft.

(1-2. Painting Device Body)

As shown in FIG. 1, the main components of the robot body 20 include a base 21, a leg portion 22, a rotating shaft portion 23, a rotating arm 24, a first revolving arm 25, a second revolving arm 26, a wrist portion 27 and motors M1 to M6 for driving components 21-27. Additionally, although the portion from the rotating shaft portion 23 to the wrist portion 27 corresponds to the robot arm R1, other portions but the leg portion 22 may also correspond to the robot arm R1.

Among those, although the base 21 is a portion set at a setup location such as a floor, the base 21 may also be travelable relative to the setup location. In addition, the leg portion 22 is a portion vertically arranged from the base 21 toward the upper side. Further, a joint portion may be provided between the leg portion 22 and the base 21 so that the leg portion 22 is revolvable relative to the base 21.

In addition, the rotating shaft portion 23 is provided at the upper end of the leg portion 22. The rotating arm 24 is mounted to the rotating shaft portion 23 in a rotatable state. In addition, the rotating arm 24 rotates through the drive of the motor M1 and an electric motor or a pneumatic motor may be used as such motor M1. In addition, when the painting robot 10 is arranged in an explosion-proof area and an electric motor is used, it is preferable to take an explosion-proof countermeasure, such as increasing the internal pressure in the housing of the rotating shaft portion 23 (the same shall apply for the following electric motors M2 to M6). However, when the painting robot 10 is arranged in a location other than an explosion-proof area, the above explosion-proof countermeasure may not be taken.

In addition, one end side of the first revolving arm 25 is mounted to the rotating arm 24 in a revolvable state. Further, the motor M2 that rotates the first revolving arm 25 relative to the rotating shaft portion 23 may be accommodated in the housing of the rotating arm 24 or may be accommodated in the housing of the first revolving arm 25.

In addition, one end side of the second revolving arm 26 is mounted to the other end side of the first revolving arm 25 via a shaft portion in a swingable state. The motor M3 that rotates the second revolving arm 26 relative to the first revolving arm 25 may be accommodated in the housing of the first revolving arm 25 or may be accommodated in the housing of the second revolving arm 26.

The wrist portion 27 is mounted to the other end side of the second revolving arm 26. The wrist portion 27 is capable of rotational movement around a plurality of (e.g. three) shaft portions in different directions. Thereby, the direction of the nozzle head unit 50 can be accurately controlled. Further, the number of shaft portions may be any number as long as it is more than or equal to two.

Motors M4 to M6 are provided for enabling the rotational movement of such wrist portion 27 around respective shaft portions. Further, although the motors M4 to M6 are accommodated in the housing of the second revolving arm 26, it may be accommodated in other locations.

In addition, the nozzle head unit 50 is mounted to the wrist portion 27 via a holder portion (not shown). That is to say, the nozzle head unit 50 is detachably provided to the wrist portion 27 via the holder portion.

Further, the painting robot 10 including the rotating shaft portion 23, the rotating arm 24, the first revolving arm 25, the second revolving arm 26, the wrist portion 27 and the motors M1 to M6 for driving them as described above is a robot that can be driven in six axes. However, the painting robot 10 can be a robot driven in any number of axes, as long as it has four or more axes.

(1-3. Nozzle Head Unit)

Figure 3:
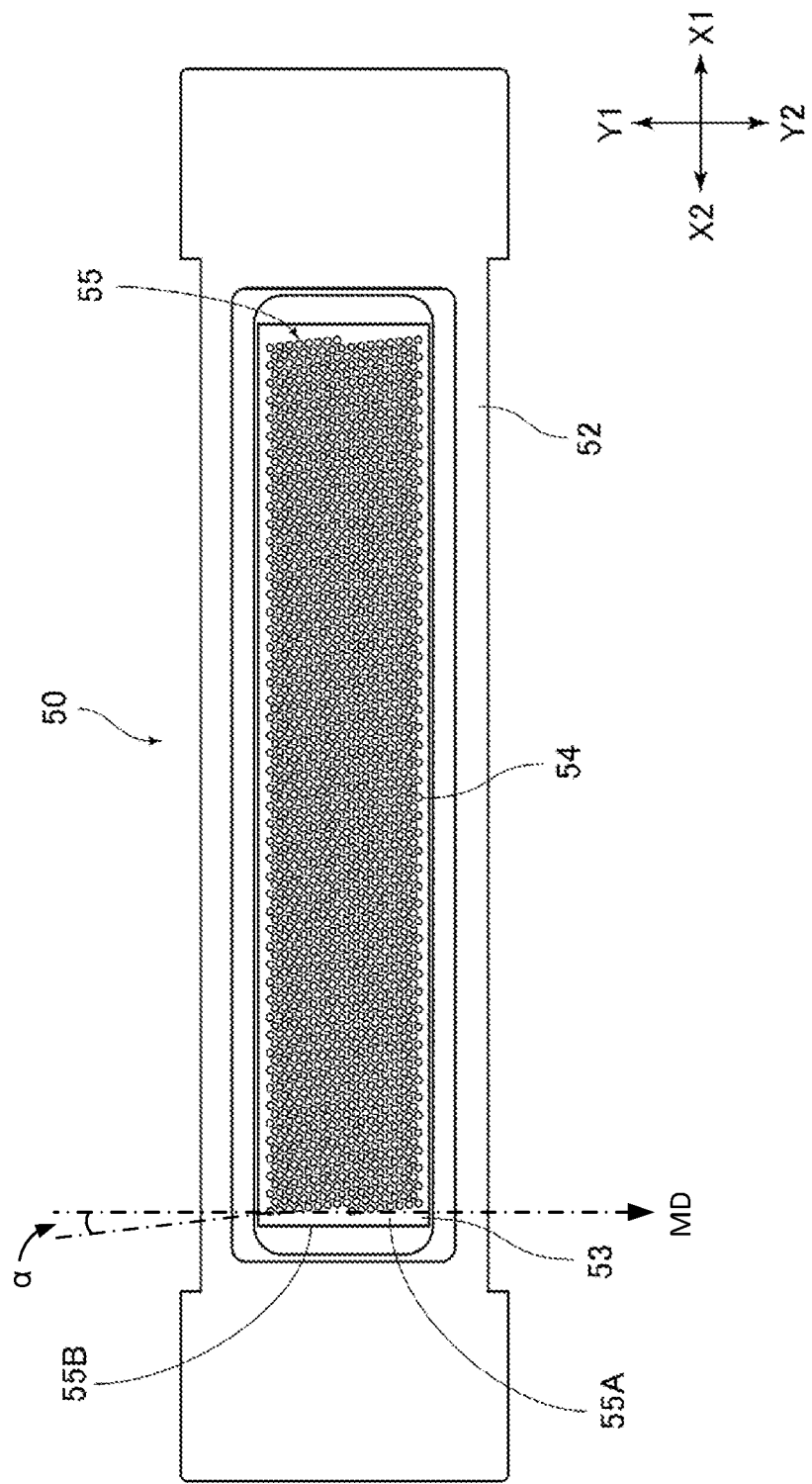
FIG. 3 shows a front view of a nozzle discharging surface of a nozzle head unit of the painting robot, from which paint is discharged.
Figure 4:
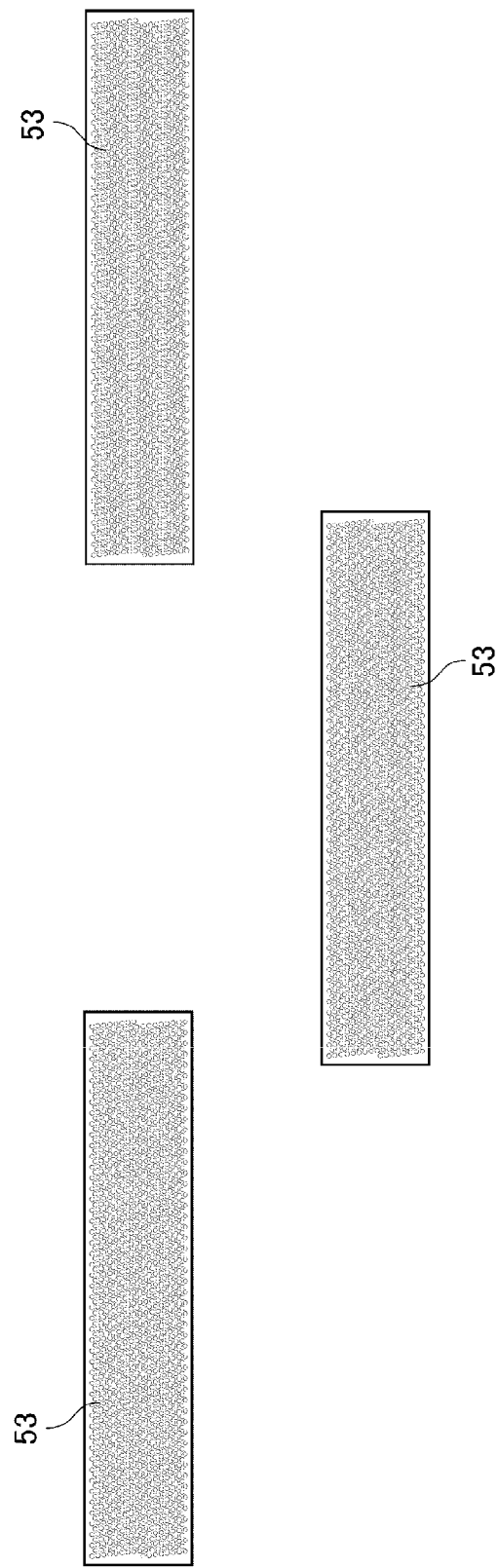
FIG. 4 shows a state where a plurality of nozzle heads are arranged in a staggered shape in the painting robot shown in FIG. 1.
Figure 5:
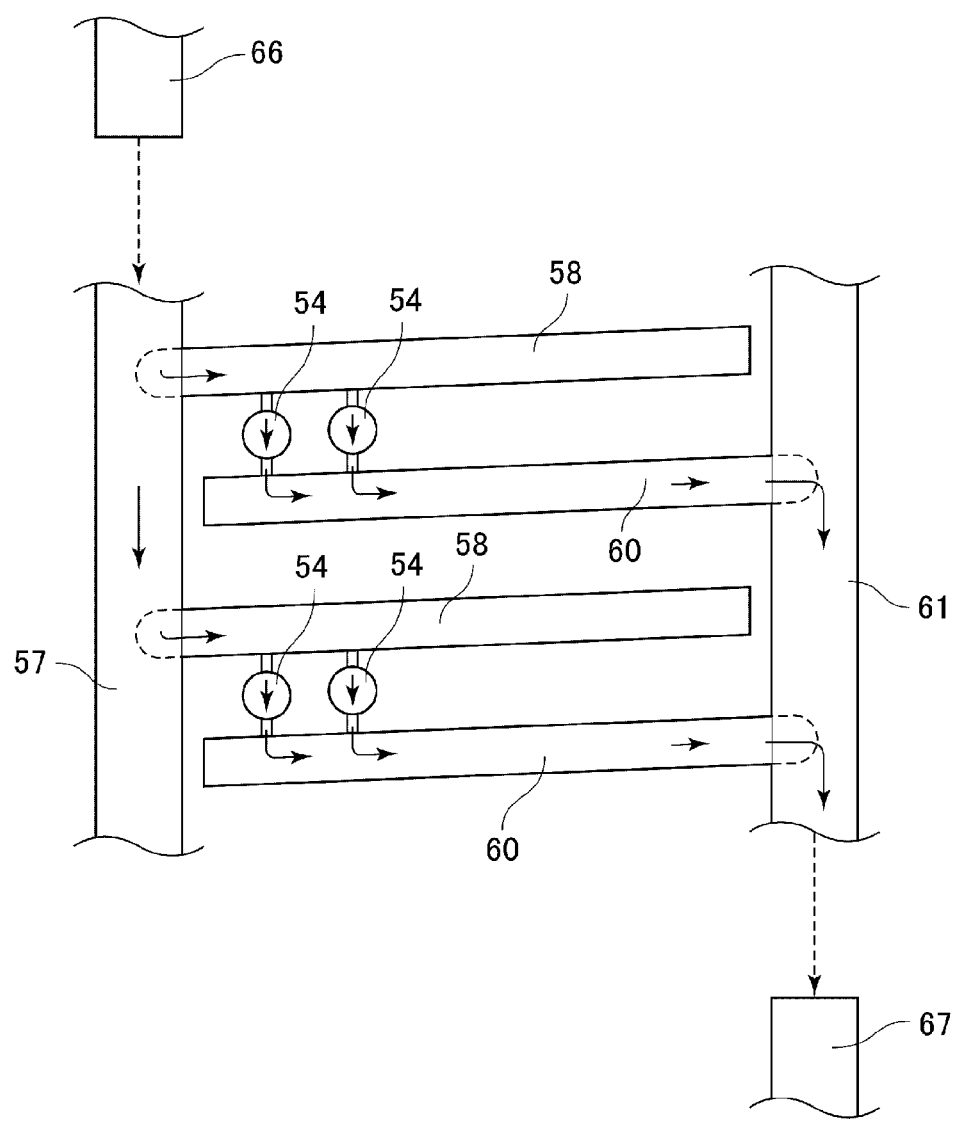
FIG. 5 shows a schematic configuration supplying paint to each nozzle in the painting robot shown in FIG. 1.

Next, the nozzle head unit 50 will be described. The nozzle head unit 50 is mounted to the wrist portion 27 via a chuck portion 30. As shown in FIG. 3 to FIG. 5, the nozzle head unit 50 includes a head cover 51 and various configurations are built in the head cover 51. Further, the configurations built in the head cover 51 for example include a head side circulation path (not shown) which is a path for paint circulation, a head control unit 130 and the like.

FIG. 3 shows a front view of the nozzle discharging surface 52 of the nozzle head unit 50, from which paint is discharged. As shown in FIG. 3, the nozzle discharging surface 52 is provided with a plurality of nozzle columns 55 in which the nozzles 54 are lining up in a direction inclined to the width direction of the nozzle head unit 50 (Y direction; the main scanning direction). In the present embodiment, a first nozzle column 55A located on one side (Y2 side) of the main scanning direction (Y direction) and a second nozzle column 55B (Y1 side) located on the other side of the main scanning direction (Y direction) are provided in such nozzle column 55.

Further, when discharging paint, the driving timings of the nozzles 54 are controlled so that droplets discharged from the nozzles 54B in the second nozzle column 55B drop between adjacent nozzles 54A in the first nozzle column 55A. Thereby, the point density can be increased during painting.

Meanwhile, as shown in FIG. 3, a single nozzle head 53 is present on the nozzle discharging surface 52. However, a head group including a plurality of nozzle heads 53 may be present on the nozzle discharging surface 52. In this case, as shown in FIG. 4, although as an example, a configuration in which the plurality of nozzle head 53 are aligned and arranged in a staggered shape are illustrated, the arrangement of the nozzle head 53 in the head group may not be in a staggered shape.

Figure 6:
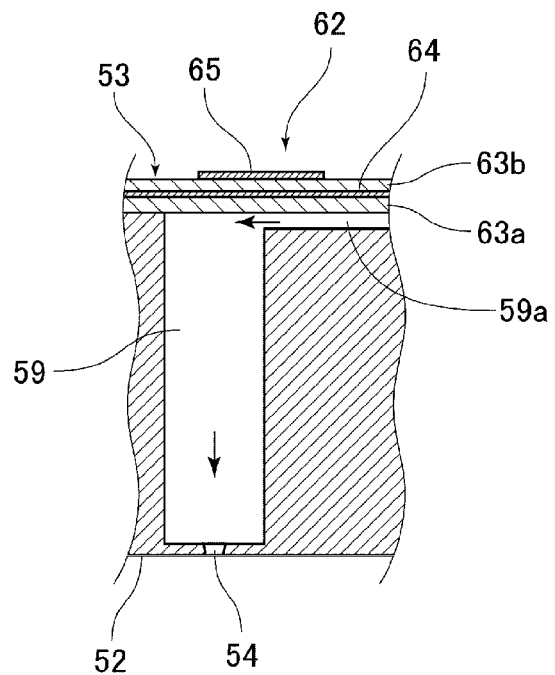
FIG. 6 is a sectional view showing a configuration in a vicinity of a column-direction supply flow path, a nozzle pressurizing chamber and a column-direction exhaust flow path shown in FIG. 5.

FIG. 5 shows a schematic configuration supplying paint to each nozzle 54. FIG. 6 is a sectional view showing a configuration in a vicinity of the column-direction supply flow path 58, a nozzle pressurizing chamber 59 and a column-direction exhaust flow path 60. As shown in FIGS. 5 and 6, the nozzle head 53 includes a supply side large flow path 57, a column-direction supply flow path 58, a nozzle pressurizing chamber 59, a column-direction exhaust flow path 60, and an exhaust side large flow path 61. The supply side large flow path 57 is a flow path to supply paint from the supply path 66 of the head side circulation path described later. In addition, the column-direction supply flow path 58 is a flow path through which the paint in the supply side large flow path 57 is diverted.

In addition, the nozzle pressurizing chamber 59 is connected to the column-direction supply flow path 58 via the nozzle supply flow path 59a. Thereby, paint is supplied from the column-direction supply flow path 58 to the nozzle pressurizing chamber 59. The nozzle pressurizing chamber 59 is provided corresponding to the number of nozzles 54 and the paint therein can be discharged from the nozzles 54 using a driving element described later.

In addition, the nozzle pressurizing chamber 59 is connected to the column-direction exhaust flow path 60 via a nozzle exhaust flow path (not shown). Therefore, paint not discharged from the nozzles 54 is exhausted from the nozzle pressurizing chamber 59 to the column-direction exhaust flow path 60 via the nozzle exhaust flow path. In addition, the column-direction exhaust flow path 60 is connected to the exhaust side large flow path 61. The exhaust side large flow path 61 is a flow path in which the paint exhausted from respective column-direction exhaust flow paths 60 converges. The exhaust side large flow path 61 is connected to the return path 67 of the head side circulation path.

With such a configuration, the paint supplied from the supply path 66 of the head side circulation path is discharged from the nozzles 54 via the supply side large flow path 57, the column-direction supply flow path 58, the nozzle supply flow path 59a, and the nozzle pressurizing chamber 59. In addition, paint not discharged from the nozzles 54 passes through the nozzle exhaust flow path, the column-direction exhaust flow path 60 and the exhaust side large flow path 61 from the nozzle pressurizing chamber 59, and returns to the return path 67 of the head side circulation path.

Further, in a configuration shown in FIG. 5, one column-direction exhaust flow path 60 is arranged corresponding to one column-direction supply flow path 58. However, a plurality of (e.g. two) column-direction exhaust flow paths 60 may also be arranged corresponding to one column-direction supply flow path 58. In addition, one column-direction exhaust flow path 60 may also be arranged corresponding to a plurality of column-direction supply flow paths 58.

In addition, as shown in FIG. 6, the piezoelectric substrate 62 is arranged on the top surface (the surface opposite to the nozzles 54) of the nozzle pressurizing chamber 59. The piezoelectric substrate 62 includes two piezoelectric ceramic layers 63a and 63b which are piezoelectric bodies and includes a common electrode 64 and an individual electrode 65. The piezoelectric ceramic layers 63a and 63b are members that can be expanded and contracted by applying a voltage from the outside. Such piezoelectric ceramic layers 63a and 63b can use ceramic materials with ferroelectricity, such as lead zirconate titanate (PZT) based, NaNbO3 based, BaTiO3 based, (BiNa) NbO3 based and BiNaNb5O15 based materials.

In addition, as shown in FIG. 6, the common electrode 64 is arranged between the piezoelectric ceramic layer 63a and the piezoelectric ceramic layer 63b. In addition, a surface electrode (not shown) for the common electrode is formed on the upper surface of the piezoelectric substrate 62. The common electrode 64 and the surface electrode for the common electrode are electrically connected via a through conductor (not shown) present in the piezoelectric ceramic layer 63a. In addition, the individual electrodes 65 are respectively provided at positions facing the above nozzle pressurizing chambers 59. Furthermore, a portion of the piezoelectric ceramic layer 63a sandwiched between the common electrode 64 and the individual electrode 65 is polarized in the thickness direction. Therefore, in response to applying a voltage to the individual electrode 65, the piezoelectric ceramic layer 63a is strained due to the piezoelectric effect. For this reason, in response to applying a prescribed driving signal to the individual electrode 65, the piezoelectric ceramic layer 63b varies relatively so as to reduce the volume of the nozzle pressurizing chamber 59, thereby discharging the paint.

Figure 7:
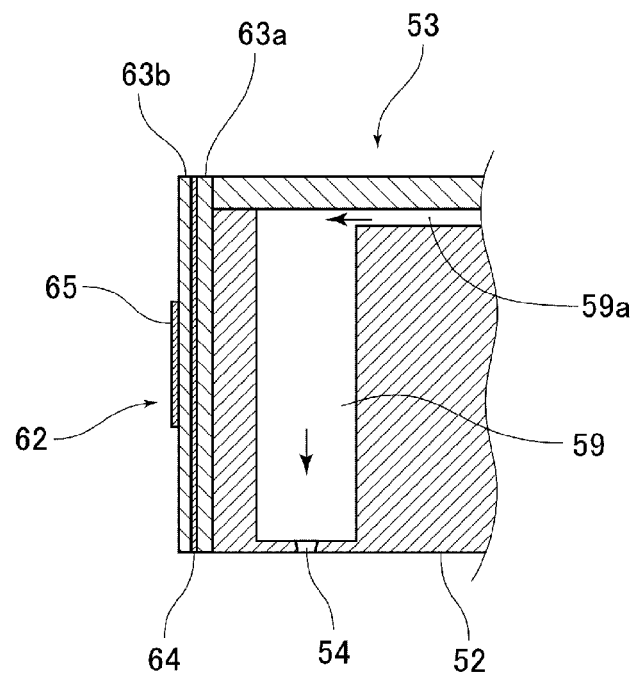
FIG. 7 is a sectional view showing a modified example of a configuration in the vicinity of the column-direction supply flow path, the nozzle pressurizing chamber and the column-direction exhaust flow path shown in FIG. 6.

Further, although in a configuration shown in FIG. 6, the common electrode 64 is arranged on the top surface of the nozzle pressurizing chamber 59, it is not limited to this configuration. For example, as shown in FIG. 7, the common electrode 64 may be arranged on the side surface of the nozzle pressurizing chamber 59, and any other configuration may be adopted as long as the paint can be sufficiently discharged from the nozzles 54.

(1-4. Other Configurations of the Nozzle Head Unit)

Figure 8:
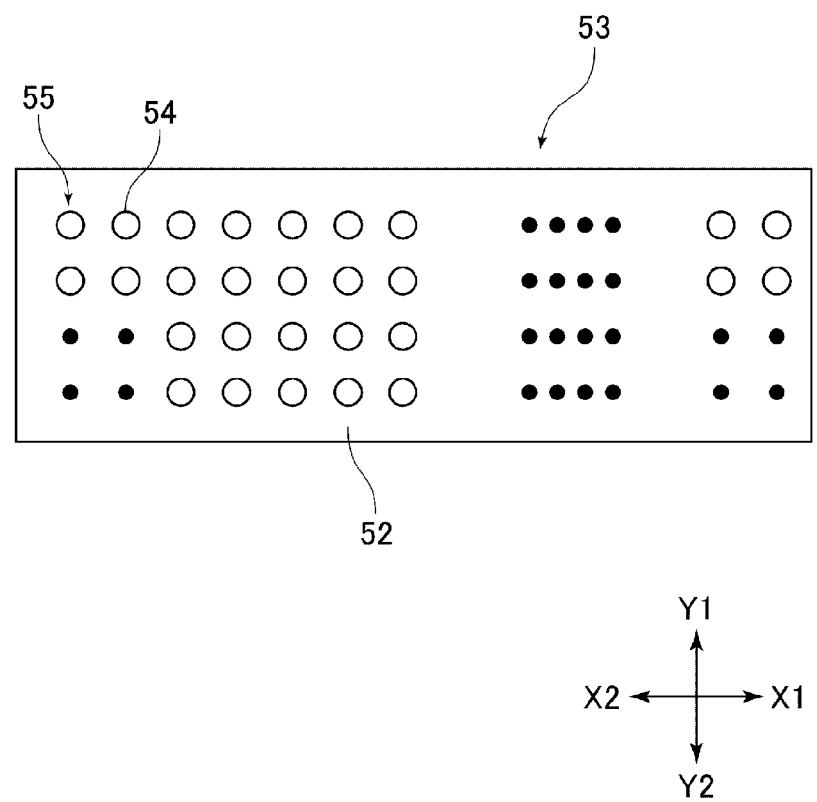
FIG. 8 is a plan view showing a configuration of a nozzle discharging surface of a further nozzle head unit different from the nozzle head unit shown in FIG. 3.

Next, other configurations of the nozzle head unit will be described. FIG. 8 is a plan view showing a configuration of a nozzle discharging surface 52 of a further nozzle head unit. As shown in FIG. 8, a nozzle column 55 may be constituted by arranging a plurality of nozzles 54 in the short direction (width direction; Y direction) of the nozzle head 53. Further, although in a configuration shown in FIG. 8, a nozzle column 55 is constituted by arranging a plurality of nozzles 54 in the short direction (width direction; Y direction) of the nozzle head 53, a configuration in which only one (single) nozzle 54 is arranged in the short direction (width direction; Y direction) of the nozzle head 53 may be adopted. That is to say, the nozzle column 55 may be constituted by one nozzle 54.

In addition, when painting a vehicle 200 using the nozzle head 53 shown in FIG. 8, painting may be performed in a state where the long direction of the nozzle head 53 (X direction) is slightly inclined to the main scanning direction in which the nozzle head 53 scans. For example, in a configuration of the nozzle head 53 shown in FIG. 3, the long direction of the nozzle head 53 (X direction) may be inclined to the main scanning direction of the nozzle head 53 by an angle α if the nozzle column 55 is inclined to the main scanning direction by an angle α. With this inclination, the same painting as the nozzle head 53 shown in FIG. 3 can be achieved by only adjusting the discharging timing of the paint from the nozzles 54.

(1-5. Mounting Structure of Nozzle Head and the Distance Detection Sensor)

Figure 9:
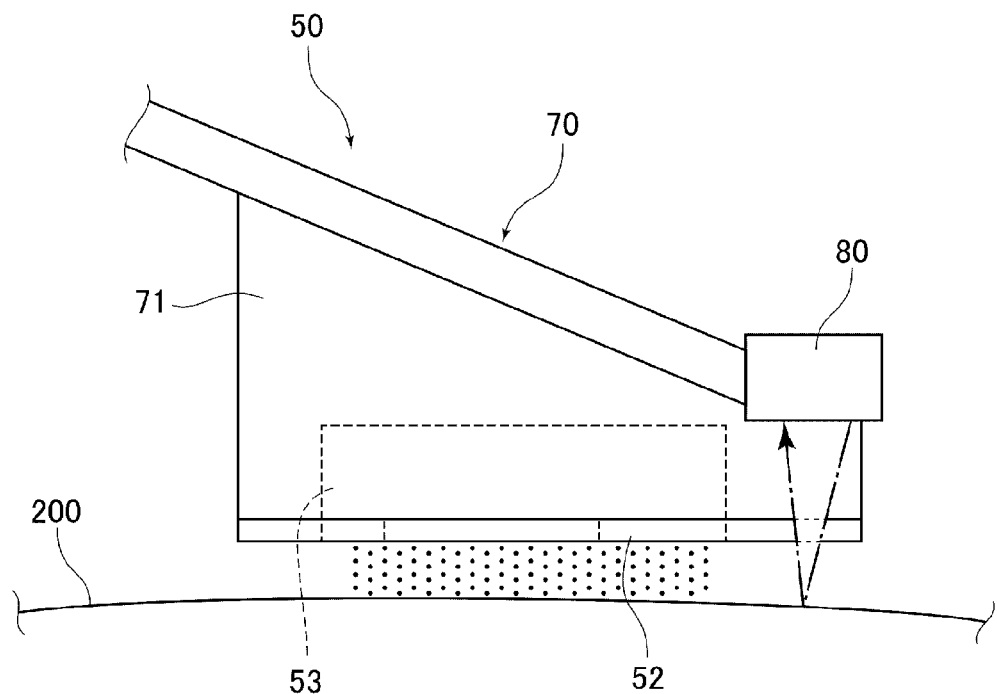
FIG. 9 shows a mounting structure of a nozzle head in the painting robot shown in FIG. 1 and is shown in a state where the long direction of the nozzle head is facing front.

Next, the mounting structure 70 of the nozzle head 53 and the distance measuring device 80 will be described. FIG. 9 shows a mounting structure 70 of the nozzle head 53 and is shown in a state where the long direction of the nozzle head 53 (X direction) is facing front. Further, the mounting structure 70 together with the nozzle head 53 constitutes the nozzle head unit 50.

The mounting structure 70 is mounted to the tip side (one side of the wrist portion 27) of the robot arm R1. As shown in FIG. 9, the mounting structure 70 has a bracket 71 formed of for example metal, resin or the like. The bracket 71 is a member mounted in a state where paint can be discharged from nozzles 54 of the nozzle head 53. In the bracket 71, the distance detection sensor 80 is mounted on the front side in the main scanning direction compared to the nozzle head 53 (the Y1 side in FIG. 10 described later). When the bracket 71 is viewed in a plan view, it is provided in an approximately rectangular form. In addition, in a configuration shown in FIG. 9, the distance detection sensor 80 is mounted on the tip side of the bracket 71 (the X1 side end; the right side end in FIG. 9).

The distance detection sensor 80 is a sensor for measuring the distance between the mounting structure 70 and the painting portion of the vehicle 200. In a configuration shown in FIG. 9, the mounting position of the distance detection sensor 80 in the bracket 71 is measured in advance and the distance between the distance detection sensor 80 and the nozzle discharging surface 52 is also measured in advance. Thus, the distance between the nozzle discharging surface 52 and the painting portion of the vehicle 200 can be measured based on the distance measured by the distance detection sensor 80.

Further, although in a configuration shown in FIG. 9, the distance detection sensor 80 may be a sensor for measuring distance by a laser beam projecting and light receiving method, it may also be a sensor other than using a laser beam projecting and receiving method, such as a sensor measuring distance by infrared ray, a sensor measuring distance by ultrasonic wave, and a camera capable of capturing images of the vehicle 200.

In addition, in a configuration shown in FIG. 9, only one distance detection sensor 80 is shown. In this manner, even only one distance detection sensor 80 is used, the distance between the nozzle discharging surface 52 and the painting portion of the vehicle 200 can be accurately measured. Further, when only one distance detection sensor 80 is used in this way, posture data (described later) associated with the posture of the nozzle head 53 at the position where the distance is currently being measured may be used.

However, it may also be configured to use three or more distance detection sensors 80 that are not arranged in the same straight line and measure the distance between the nozzle discharging surface 52 and the painting portion of the vehicle 200 by respective distance detection sensors 80. When three or more distance detection sensors 80 that are not arranged in the same straight line are used, the actual plane inclination of the nozzle head 53 with respect to the painting portion of the vehicle 200 can be measured.

Figure 10:
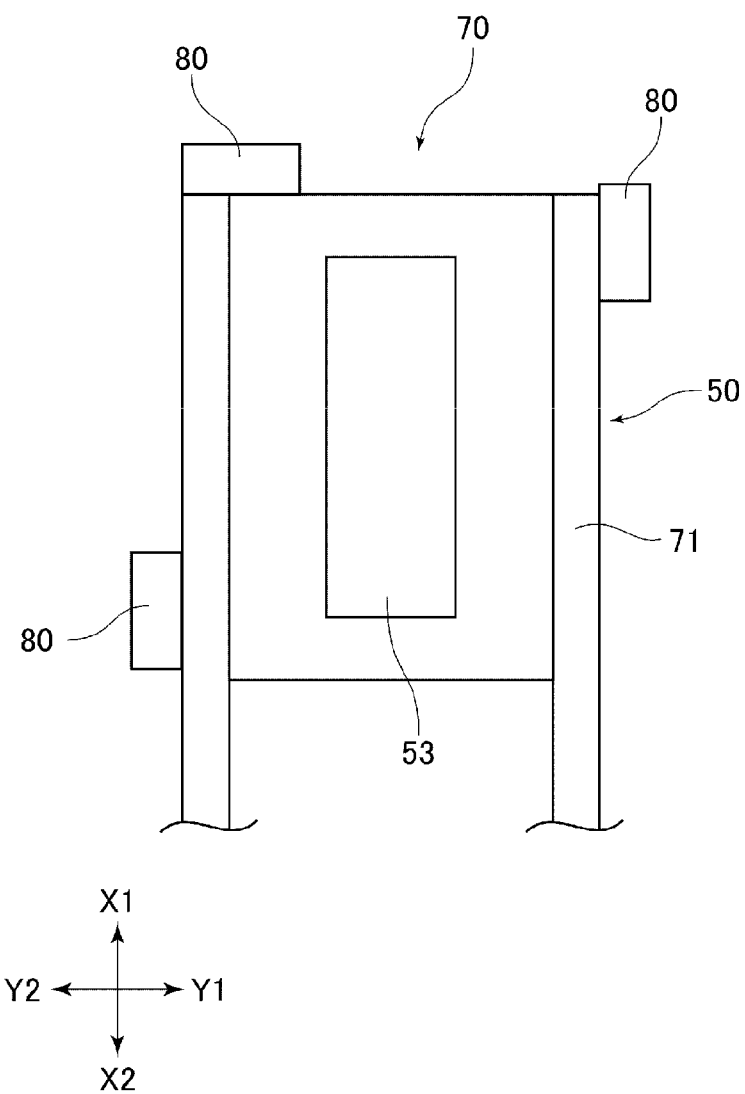
FIG. 10 is a plan view showing a configuration of the mounting configuration shown in FIG. 9.

Further, for example when three distance detection sensors 80 are used, the three distance detection sensors 80 may be mounted as shown in FIG. 10. FIG. 10 is a plan view showing a configuration of the mounting structure. In FIG.

10, the other two distance detection sensors 80 are mounted at mounting positions other than the upper right side (the X1 side and Y1 side seen from the center of the bracket 71) of the bracket 71. For example, as shown in FIG. 10, the mounting positions of such distance detection sensors 80 include the upper left side (the X1 side and Y2 side seen from the center of the bracket 71) of the bracket 71, the lower right side (the X2 side and Y2 side seen from the center of the bracket 71), and the like. However, the distance detection sensor 80 may also be mounted at locations other than these positions.

(1-6. Control Configuration of the Painting Robot)

Next, the control device of the painting robot 10 according to the present embodiment will be described with reference to FIG. 2. The control device has an image processing portion 100, an arm control unit 110, a paint supply control unit 120, a head control unit 130 and a main control unit 140. Further, the image processing portion 100, the arm control unit 110, the paint supply control unit 120, the head control unit 130 and the main control unit 140 include a CPU, a memory (ROM, RAM, non-volatile memory, etc.), and other elements. In addition, programs and data for executing the desired control are stored in the memory.

The image processing portion 100 creates a three-dimensional model (three-dimensional model for painting) based on CAD data corresponding to the painting area of the vehicle. In addition, the image processing portion 100 forms two-dimensional divided painting data corresponding to painting along the trajectory data by the nozzle head 53 based on the painting path (painting path PN) formed by the arm control unit 110 described later and the above-mentioned three-dimensional model for painting.

Further, although the image processing portion 100 and the arm control unit 110 correspond to a painting data forming device, they may also correspond to the painting data forming device by including at least one portion other than these (for example the head control unit 130 and the main control unit 140 and the like). The image processing portion 100 forms painting data for controlling the driving of each nozzle 54 of the nozzle head 53, and the painting data includes information about the voltages applied to the piezoelectric substrates 62 of respective nozzles 54 and the like.

In addition, the arm control unit 110 is a portion that controls the driving of the above-mentioned motors M1 to M6. The arm control unit 110 includes a memory 111 that stores trajectory data created by robot teaching taking into account the paintable width of the nozzle head 53 and posture data associated with the posture of the nozzle head 53. Moreover, the arm control unit 110 controls the driving of the motors M1 to M6 based on the trajectory data and posture data stored in the memory 111 and the image processing by the image processing portion 100. Through the control, the nozzle head 53 may pass through a desired position for performing the painting at a desired speed or stop at a predetermined position. Further, although the memory 111 may be included in the painting robot 10, the memory 111 may also be provided outside the painting robot 10 and information may be sent to or received by the memory 111 via a wired or wireless communication device.

In addition, the paint supply control unit 120 controls the supply of paint to the nozzle head 53 and specifically controls the operation of the pumps and the valves and the like included in the paint supply portion 40. At this time, it is preferable that the paint supply control unit 120 controls the operation of the above-mentioned pumps and valves so that paint is supplied to the nozzle head 53 at a constant pressure (constant amount, as an example of the constant pressure).

In addition, the head control unit 130 controls the operation of the piezoelectric substrate 62 in the nozzle head unit 50 based on image processing by the image processing portion 100. When a predetermined position in the trajectory data is reached by a position detection device (position detection sensor 150) such as an encoder, the head control unit 130 controls discharge of paint based on the divided painting data corresponding to that position. Further, in this case, the driving frequency of the piezoelectric substrate 62 is controlled to control the number of dots (number of droplets) discharged from the nozzles 54, or the voltage applied to the piezoelectric substrate 62 is controlled to control the size of the droplets discharged from the nozzles 54 so that the film thickness of the vehicle becomes uniform.

Further, the head control unit 130 may determine the width (painting width) that the nozzles 54 discharge paint in the nozzle head 53 along the long direction (X direction) of the nozzle head 53, based on trajectory data created by robot teaching and posture data associated with the posture of the nozzle head 53 stored in the memory 111. In addition, the head control unit 130 may also determine the painting width based on the measurement result of the distance measured by the above-mentioned distance detection sensor 80.

In addition, the main control unit 140 sends a predetermined control signal to the above-mentioned arm control unit 110, the paint supply control unit 120 and the head control unit 130 so that the above-mentioned motors M1 to M6, the paint supply portion 40 and the piezoelectric substrate 62 cooperate to perform painting to the painting object.

In addition, various position detection sensors 150 are connected to the robot body 20 so that the nozzle discharging surface 52 of the nozzle head 53 is kept parallel to the painting surface under the control of the arm control unit 110. Such position detection sensors 150 include angular velocity sensors, acceleration sensors, image sensors, ToF (Time of Flight) sensor and the like, however, other sensors may also be used.

[12. Painting Method]

Next, the painting method of painting a painting object such as a vehicle or a vehicle component using the painting robot 10 having the above-mentioned configuration will be described.

(2-1. Summary of a Painting Method Using the Painting Robot 10)

Figure 11:
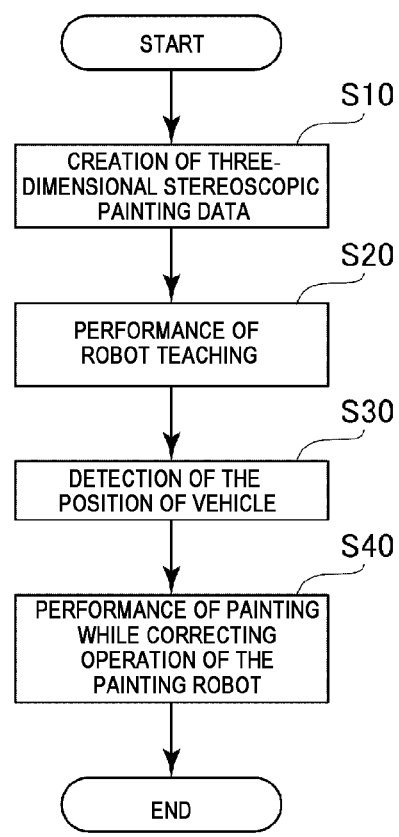
FIG. 11 shows a schematic process flow of a painting method using the painting robot shown in FIG. 1.

First, summary of a painting method using the painting robot 10 will be described with reference to FIG. 11. FIG. 11 shows a schematic process flow of the painting method using the painting robot according to the present embodiment.

First, the image processing portion 100 of the painting robot 10 creates a three-dimensional model (a three-dimensional model for painting) based on the CAD data of the vehicle (Step S10). In the three-dimensional model for painting, a stereoscopic three-dimensional model is created for the portions that will actually be painted, excluding the portions that will not be painted.

Next, robot teaching is performed which creates a program for controlling the painting robot 10 in order to paint the vehicle 200 (Step S20). Further, in this robot teaching, offline teaching, which is performed while performing 3D display on a computer (for example, the image processing portion 100 shown in FIG. 2 is also an example thereof), may be performed based on the above-mentioned three-dimensional model for painting.

After the robot teaching in the above-mentioned Step S20 is performed, the position of the vehicle 200 conveyed in by the actual painting line is detected by the distance detection sensors 80 and the position detection sensors 150 (Step S30).

Then after detecting the position of the vehicle 200, painting is performed while correcting the operation of the painting robot 10 (Step S40). In the correction, when a plurality of predetermined passing points (passing positions) exist in the painting path PN described later, the actual passing positions with respect to the predetermined passing points are measured by the distance detection sensors 80 or the position detection sensors 150. Then by correcting the operation of the robot body 20 based on the measured actual passing positions, the accuracy of the actual passing positions with respect to the next or later predetermined passing points are improved. That is to say, the operation of the robot body 20 is corrected so that the amount of position deviation of passing positions becomes smaller. In this manner, painting is performed on the vehicle 200 with discharging paint from the nozzles 54 of the nozzle head 53 while correcting is performed to improve the accuracy of the passing positions. Further, in Step S40, not only the accuracy of the passing positions but also the passing speed can be corrected.

Further, when the arrival of the next vehicle 200 is detected, the operations of the above-mentioned steps S10 to S40 are repeated.

(2-2. Details About Robot Teaching)

Figure 12:
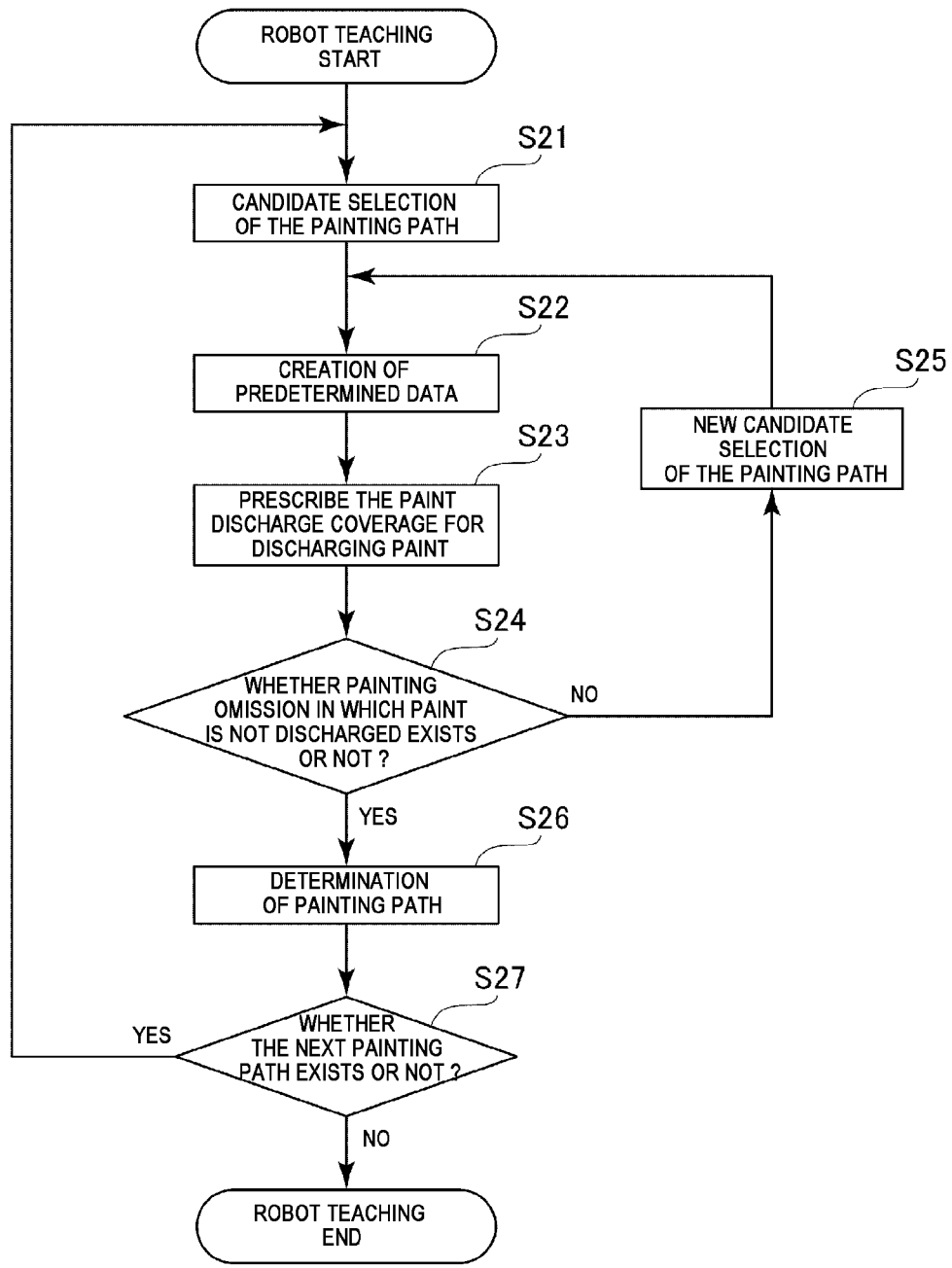
FIG. 12 shows a schematic process flow of a robot teaching in FIG. 11.

Next, details about the robot teaching in the above-mentioned step S20 will be described with reference to FIG. 12. FIG. 12 shows a schematic process flow of the robot teaching in FIG. 11. Further, by performing the robot teaching shown in FIG. 12, trajectory data and posture data as described later are created and a paint discharge coverage L1 for each painting path PN is determined.

First, a candidate for the painting path PN is selected (Step S21). Here, the "N" of the painting path PN corresponds to the creation order of the painting path and becomes the painting path P1 in the case of the initial painting path. At this time, the painting path PN is created in the program so that the distance between the nozzle discharging surface 52 and the painting portion of the vehicle 200 becomes within a prescribed range (within a threshold value) while avoiding collision with the vehicle 200.

In this case, for example the initial painting path P1 can be appropriately and freely selected from the painting surfaces of the vehicle 200. In the initial painting path P1, the initial painting path P1 is preferably selected for the vehicle 200 such that it becomes a painting path capable of shortening the painting time while maintaining the painting quality. Although in Step S21, the candidate of the painting path PN may be selected based on the actual vehicle 200, it is preferable to select the painting path PN based on the above-mentioned three-dimensional model for painting. In the following description, the vehicle 200 is described as including a three-dimensional model for painting.

In addition, a reference position to make the above distance within the prescribed range can be freely selected. For example, when one end side in the width direction of the vehicle 200 is the initial painting path P1, the center of the paint discharge coverage L1 (described later) of the initial painting path P1 may be set as the reference position so that good painting without painting omission is performed on the one end side in the width direction. Then, the paint discharge coverage L1 can be taken widely by setting the reference position to be the lower limit of the prescribed range as described above. This is because for example when the convex curved surface is painted, the interval between the vehicle 200 and the nozzle discharging surface 52 increases when moving away from the reference position. Therefore, preferably, the center of the paint discharge coverage L1 is set as the reference position.

Further, the center of the paint discharge coverage L1 as described above may not be a positional center in the strict sense. For example, in the case where the painting portion of the vehicle 200 is not an arc-shaped curved surface, but the curvature changes from midway, the center of the paint discharge coverage L1 may also be slightly offset from the positional center.

Here, when the painting path PN has been created, predetermined data is then created (Step S22). Here, the predetermined data are as follows. That is to say, as the predetermined data, a painting start position, a plurality of predetermined passing points in the painting path PN and posture data of the nozzle head 53 at each of the predetermined passing points may be included. In addition, as the predetermined data, velocity data at each of the predetermined passing point, and the position accuracy allowed when the actual passing position is actually measured by the distance detection sensors 80 or the position detection sensors 150 for each of the predetermined passing points may be included. Further, as the predetermined data, data on the size of the tool when the nozzle head unit 50 is used as a tool may be included. Here, examples of such data on the size of the tool include the position from the reference point of the wrist portion 27 to the center of the nozzle head 53 when the nozzle head unit 50 is mounted to the wrist portion 27. However, data on the size of the nozzle head unit 50 may also be measured at a location other than the above-mentioned reference point and the center of the nozzle head 53.

In addition, the posture data is as follows. That is to say, at each of the predetermined passing points of the painting path PN, the curvatures of the curved surface of the painting portion of the vehicle 200 are generally different. Therefore, in robot teaching, posture data is created such that the nozzle head 53 has a desired inclination angle at each of predetermined passing points. Thereby, the robot body 20 can advance the nozzle head 53 while controlling its posture, so that the paint discharge coverage L1 can be properly secured.

Next, the coverage of discharging paint in the long direction (X direction) of the nozzle head 53 (paint discharge coverage L1) is prescribed based on the above-mentioned painting path PN and the predetermined data including posture data (Step S23). In the prescription of the paint discharge coverage L1, the distance between each position in the long direction (X direction) of the nozzle head 53 and the vehicle 200 is calculated based on the distance from the reference position of the painting path PN to the vehicle 200 and predetermined data including posture data having inclination angles around the axes. Through the calculation results, the range in which the above-mentioned distance between the nozzle discharging surface 52 and the painting portion of the vehicle 200 is within a prescribed range (within a threshold value) is prescribed as the above-mentioned paint discharge coverage L1.

Figure 14:
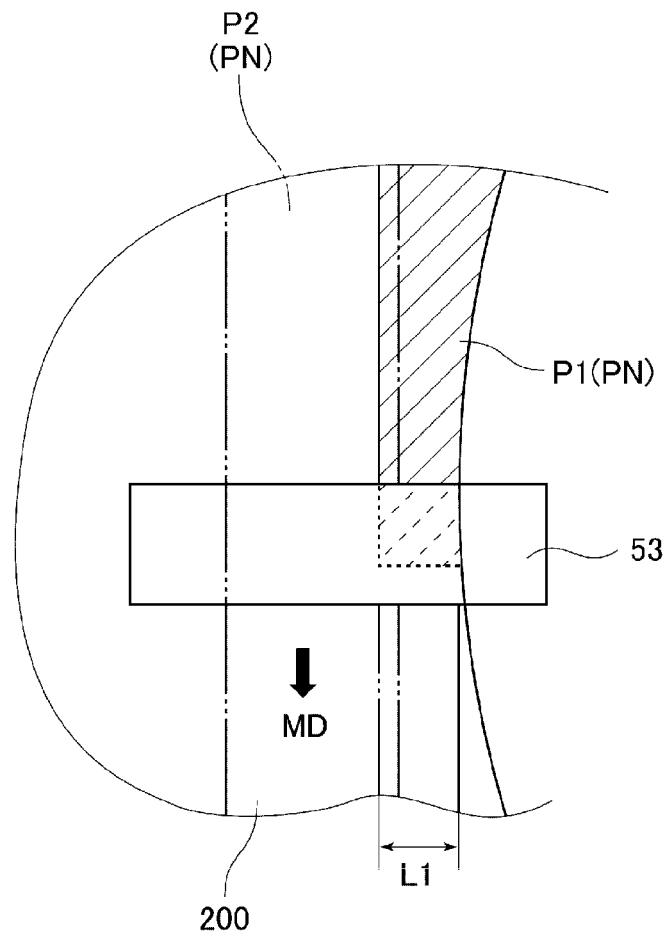
FIG. 14 shows an image of painting while moving the nozzle head in a main scanning direction.

FIG. 13 is a schematic diagram showing the image of the paint discharge coverage L1 of the nozzle head 53. FIG. 14 shows an image of painting while moving the nozzle head 53 in the main scanning direction. Here, in FIG. 14, MD refers to the main scanning direction and the hatched portion shows an image in which painting is performed by moving the nozzle head 53 in the main scanning direction MD. However, in FIG. 14, since the hatched portion corresponds to the initial painting path P1 in the painting path PN, the reference numeral P1 is assigned. In addition, in FIG. 14, the next painting path P2 is also shown with a chain double-dashed line. Further, in FIG. 13 and FIG. 14, a case where the roof of the vehicle 200 is painted is assumed and illustrated.

As shown in FIGS. 13 and 14, in the prescription of the paint discharge coverage L1, for example, when painting is applied to a portion of the roof of the vehicle 200 on one end side (X1 side in FIGS. 13 and 14), the nozzle 54 corresponding to the portion of the roof on the other end side (X2 side) approximately at the center in the paint discharge coverage L1 is specified as the nozzle 54 on the most other end side (X2 side). That is to say, in order to prevent painting omission due to deviation of the superimposed with the next painting path P2 (overlapping portion) in FIG. 14, in the initial painting path P1, the nozzles 54 on the other end side of the paint discharge coverage L1 are specified. Thereby, it is easy to handle the formation of overlapping portions starting from the next painting path P2.

On the other hand, for example, depending on the shape of the one end side (X1 side) of the roof of the vehicle 200, on the one end side (X1 side) in the long direction (X direction) of the nozzle head 53, the nozzles 54 in the paint discharge coverage L1 are changed. In this manner, for example, when painting the one end side (X1 side) of the roof of the vehicle 200, in the long direction (X direction) of the nozzle head 53, the nozzles 54 on the other end side of the paint discharge coverage L1 are specified, however, the nozzles 54 on the one end side (X1 side) of the paint discharge coverage L1 are changed according to the shape of the one end side (X1 side) of the roof.

On the other hand, for example, in a case where the shape of the one end side (X1 side) of the roof of the vehicle 200 is relatively monotonous, not only the nozzles 54 of the most other end side (X2 side) in the above-mentioned paint discharge coverage L1, but also the nozzles 54 of the most one end side (X1 side) in that paint discharge coverage L1 may be specified. Further, such specification of the nozzles 54 on the one end side (X1 side) and/or the other end side (X2 side) in the paint discharge coverage L1 may also be performed in a portion other than the roof of the vehicle 200.

Figure 15:
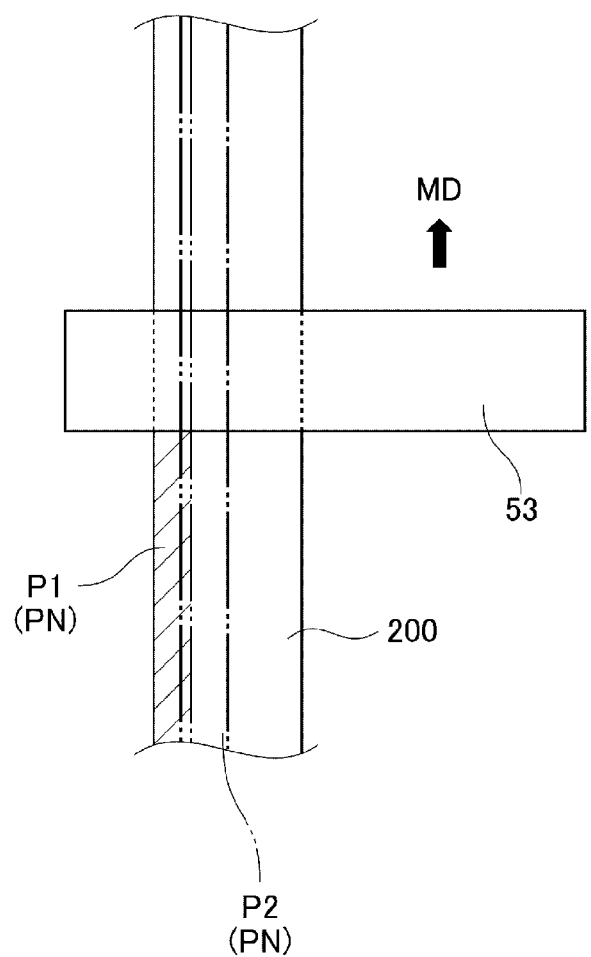
FIG. 15 shows an image of creating a painting path in a portion with a small width.

Further, FIG. 15 shows an image of creating a painting path (the initial painting path P1, the next painting path P2, and the like) in a portion with a small width such as pillars of the vehicle 200, rather than the roof with a large area as shown in FIG. 14. In this manner, the width of the painting path PN is narrowed since the width of portions where the distance between the nozzle discharging surface 52 and the painting portion of the vehicle 200 is within a prescribed range (within a threshold value) is narrowed due to, e.g., curvature increase at portions with small width.

Next, it is determined whether or not a portion is not painted according to the paint discharge coverage L1 (painting omission) prescribed in the above-mentioned step S23 exists within a scheduled painting coverage (Step S24). That is to say, if there is a painting omission within the painting coverage initially scheduled by the painting path PN, it is necessary to reset the painting path PN again, thus it is checked whether there is such a painting omission. In the determination of Step S24, if a portion that is not painted according to the paint discharge coverage L1 exists within the scheduled painting coverage (If YES), it is necessary to reset the painting path PN again, thus the candidate scanning path (painting path PN) is re-selected (Step S25).

Further, in the above-mentioned Step S24, if a portion that is not painted according to the prescribed paint discharge coverage L1 (painting omission) does not exist within the scheduled painting coverage (If NO), the painting path PN is determined (Step S26).

Then, it is determined whether there is a next painting path PN+1 (Step S27). In this determination, when it is determined that there is a next painting path PN+1, the process returns to the above-mentioned step S21. On the other hand, when it is determined that there is not a next painting path PN+1, the robot teaching ends. That is to say, the painting path PN+1 after the painting path PN is determined by going through the same steps as described above. However, when determining the paint discharge coverage L1 in step S23, the painting path PN is determined so that a superimposed (overlapping) area is formed with respect to the previous painting path PN−1.

Further, starting from the painting path P2 and until the painting path PNend−1 just before the final painting path PNend, the nozzle 54 on the most other end side in the paint discharge coverage L1 is specified, and the nozzle 54 on the most one end side in the paint discharge coverage L1 is specified. Therefore, from the painting path P2 to the painting path PNend−1, portions superimposed with both ends of the paint discharge coverage L1 (overlapping portions) are formed.

In addition, in the final painting path PNend, although the nozzle 54 on the most one end side in the paint discharge coverage L1 is specified, the nozzle 54 on the most other end side in the paint discharge coverage L1 may be specified according to the end shape of the vehicle 200 (in the case of a relatively monotonous shape) or may not be specified but change depending on the end shape.

[3. Effects]

A painting robot 10 having a configuration as described above includes: a nozzle head 53 in which a plurality of nozzles are arranged in a predetermined direction (X direction); a robot arm R1 with a tip portion to which the nozzle head 53 can be mounted and the mounted nozzle head 53 being movable with the robot arm R1; an arm control unit 110 which controls operation of the robot arm R1; a head control unit 130 which controls driving of the nozzle head 53; a distance measuring device (distance detection sensor 80) which measures the distance between the painting portion of a vehicle 200 (including vehicle components) and the nozzle discharging surface 52 of the nozzle head 53; and an image processing portion 100 which forms a three-dimensional model for painting, which is a three-dimensional model, based on a painting coverage of the vehicle 200 or the vehicle component expected to be painted. Then, in a state where the operation of the robot arm R1 is being controlled by the arm control unit 110, the head control unit 130 controls to discharge paint from nozzles 54 with distances within a prescribed range, and controls to not discharge paint from nozzles 54 outside the prescribed range, based on the distances measured between the painting portions in the three-dimensional model for painting and an imaginary nozzle head 53 for the three-dimensional model for painting or the distances measured by the distance detection sensor 80 (distance measuring device).

With such a configuration, even if there is a portion with large curvature in the painting portion of the vehicle 200, painting can be appropriately performed to improve the painting quality. In addition, by increasing the distance between the painting portion and the nozzle head 53, the flight of tiny droplets of paint can be reduced. Thereby, the waste of paint can be reduced.

Further, in the present embodiment, the nozzle head 53 is mounted on a mounting structure 70 which is mounted on the tip side of the robot arm R1, and a distance detection sensor 80 (distance measuring device) is mounted on the mounting structure 70 on one side of the main scanning direction when painting by the nozzle head 53.

Therefore, when painting using the nozzle head 53, the distance from the actual vehicle 200 can be measured by using the distance detection sensor 80 (distance measuring device). In addition, by measuring, on the front side of the nozzle head 53 in the scanning direction, the distance from the actual vehicle 200 by using the distance detection sensor 80 (distance measuring device), it is possible to prevent the paint from being discharged from the nozzles 54 in a state where the distance has expanded.

In addition, in the present embodiment, the arm control unit 110 and the head control unit 130 perform control based on robot teaching, and in the robot teaching, the arm control unit 110 creates a painting path PN which is the scanning path when painting, based on the painting portions in the three-dimensional model for painting or the painting portions in the vehicle 200, and in the robot teaching, the arm control unit 110 creates posture data in the painting path PN for the nozzle head 53 to be at a prescribed inclination angle at each position in the painting path PN, and in the robot teaching, the head control unit 130 prescribes a paint discharge coverage L1, which is a coverage in which paint is discharged, in the long direction (X direction) of the nozzle head 53, based on the painting path PN and posture data.

In this manner, by creating the painting path PN by the arm control unit 110 and creating the posture data by the head control unit 130, and prescribing the paint discharge coverage L1 by the head control unit 130 based on these data, the driving range of the nozzles 54 in the nozzle head 53 may be an appropriate range. That is to say, it is possible to cause nozzles 54 within the range in which the distance between the nozzle discharging surface 52 and the painting portion of the vehicle 200 is within a prescribed range (within a threshold value) to be driven and capable of discharging paint, while cause nozzles 54 outside the predetermined range not to be driven so that paint is not discharged. Thereby, when the distance becomes greater than the threshold value due to the portion with large curvature in the painting portion of the vehicle 200, by making nozzles 54 not to be driven so that paint is not discharged, the painting quality can be improved. In addition, when such a distance is exceeded and nozzles 54 are not driven so that paint is not discharged, the flight of tiny droplets of paint can be reduced. Thereby, the waste of paint can be reduced.

In addition, in the present embodiment, when painting on the vehicle 200 after the robot teaching, based on the detection of the vehicle 200 by the position detection sensor 150 which detects the position of the vehicle 200 and the distance detection sensor 80 (distance measuring device), the arm control unit 110 corrects at least one of the painting path PN, the posture data and the paint discharge coverage L1 created in the robot teaching while controlling the robot arm R1.

Therefore, it is possible to detect the position and the inclination degree of the vehicle 200 using the above-mentioned position detection sensors 150 and the distance detection sensors 80 (distance measuring device) while operating the painting robot 10 (robot body 20) during painting. Then, by correcting at least one of the painting path PN, the posture data and the paint discharge coverage L1 created in the robot teaching based on the detection result, the paint quality of the vehicle 200 can be further improved.

[4. Modified Examples]

Although one embodiment of the present disclosure has been described above, various modifications can be made to the present disclosure except for the above embodiment.

In the above-mentioned embodiment, in the preliminary robot teaching, the painting path PN is determined, the posture data is created, and the paint discharge coverage L1 is determined. However, the paint discharge coverage L1 may also be appropriately changed according to the detection result by the distance detection sensor 80. In this case, the painting path PN and posture data may also be calculated every time as needed.

In addition, when painting a certain vehicle 200, in the case where the operation correction of the painting robot 10 (robot body 20) as in step S40 has been performed, when repeating the same correction, it is assumed that the same correction characteristic (tendency) as the correction also exists in the future vehicles, so that at least one of the painting path PN, the posture data and the paint discharge coverage L1 may also be corrected all together.

In addition, in the above-mentioned embodiment, the nozzle head 53 includes a plurality of nozzles 54 arranged in the long direction (X direction), and the short direction (Y direction) thereof corresponds to the main scanning direction of the nozzle head 53. However, the nozzle head 53 may also include a plurality of nozzles 54 arranged in the short direction, and the long direction thereof may correspond to the main scanning direction. In this case, control may also be performed in the short direction so that paint is not discharged from nozzles 54 which are outside the prescribed range.

In addition, in the above-mentioned embodiment, a case where one or more than two distance detection sensors 80 are provided has been described. However, two distance detection sensors 80 may be provided. In this case, the distance detection sensors 80 are preferably mounted to both ends in the long direction of the nozzle head 53 respectively. In this way, inclination in the long direction of the nozzle head 53 can be measured and control can be performed based on the measured inclination.

Further, in the above-described embodiment, the painting robot 10 paints on a vehicle 200 or a vehicle component. However, the painting robot 10 may also paint on a painting object other than a vehicle 200 or a painting object other than a vehicle component.

In addition, in the above-described embodiment, as the case where a plurality of nozzles 54 are arranged in a predetermined direction, a case where nozzles 54 are arranged in the long direction (X direction) have been described. However, as long as the predetermined direction is the direction in which a plurality of nozzles 54 are arranged, it may be any direction. For example, when the aggregated portion of nozzles 54 forming a substantially rectangle in FIG. 3 is viewed in a plan view, the diagonal direction thereof may be set as the predetermined direction and another direction may also be set as the predetermined direction. In addition, if the aggregated portion of nozzles 54 is circular when the assembled portion is viewed in a plan view, the radial direction of the circle may be set as the predetermined direction and another direction may also be set as the predetermined direction. That is to say, the predetermined direction may be any direction as long as in the aggregated portion of the nozzles 54, a plurality of nozzles 54 are aligned in the direction.

REFERENCE SIGNS LIST 10 painting robot; 20 robot body; 21 base; 22 leg portion; 23 rotating shaft portion; 24 rotating arm; 25 first revolving arm; 26 second revolving arm; 27 wrist portion; 30 chuck portion; 40 paint supply portion; 50 nozzle head unit; 51 head cover; 52 nozzle discharging surface; 53 nozzle head; 53B nozzle; 54 nozzle; 54A nozzle; 54A11 nozzle; 54A12 nozzle; 54A13 nozzle; 54B nozzle; 54B11 nozzle; 54B12 nozzle; 55 nozzle column; 55A first nozzle column; 55A1 first nozzle column; 55B second nozzle column; 55B1 second nozzle column; 57 supply side large flow path; 58 column-direction supply flow path; 59 nozzle pressurizing chamber; 59a nozzle supply flow path; 60 column-direction exhaust flow path; 61 exhaust side large flow path; 62 piezoelectric substrate; 63a piezoelectric ceramic layer; 63b piezoelectric ceramic layer; 64 common electrode; 65 individual electrode; 66 supply path; 67 return path; 80 distance detection sensor (corresponding to the distance measuring device); 100 image processing portion (corresponding to a part of the painting data forming device); 110 arm control unit (corresponding to a part of the painting data forming device); 111 memory; 120 paint supply control unit; 130 head control unit; 140 main control unit; 150 position detection sensor; 200 vehicle; 201 step; D3 divided painting data; L1 painting width; L2 portion; M1 motor; M2 motor; M3 motor; M4 motor; M5 motor; M6 motor; P1 reference portion; PL projected line; S main scanning direction (short direction); T long direction.

What is claimed is:

1. A painting robot configured to discharge paint towards a painting object from a nozzle to perform painting, comprising:
   a nozzle head in which a plurality of the nozzles are arranged in a predetermined direction, the nozzle head comprising:
      at least one supply flow path,
      at least one exhaust flow path, and
      a plurality of nozzle pressurizing chambers, each nozzle pressurizing chamber comprising:
         a nozzle discharging surface defining a nozzle, the nozzle discharging surface defining at least a portion of the nozzle pressurizing chamber, and
         a piezoelectric substrate arranged on a surface of the nozzle pressurizing chamber adjacent a first side of the nozzle head opposite the nozzle pressurizing chamber from the nozzle adjacent a second side of the nozzle head, the piezoelectric substrate comprising:
            a first layer,
            a second layer, and
            at least one electrode configured to apply a driving voltage to the first layer and the second layer,
         wherein, in response to a first driving voltage, the piezoelectric substrate is configured to contract and fill the nozzle pressurizing chamber with paint received from the at least one supply path via a nozzle supply flow path connected to the nozzle pressurizing chamber adjacent the first side of the nozzle head relative to the nozzle pressurizing chamber,
         wherein, in response to a second driving voltage, the piezoelectric substrate is configured to expand and discharge the paint in the nozzle pressurizing chamber through the nozzle connected to the nozzle pressurizing chamber adjacent the second side of the nozzle head relative to the nozzle pressurizing chamber,
      wherein the plurality of nozzle pressurizing chambers connects the at least one supply flow path to the at least one exhaust flow path,
   wherein the paint is supplied from the at least one supply flow path to the plurality of nozzle pressurizing chambers to discharge paint from each of the plurality of nozzles and the paint not discharged passes to the at least one exhaust flow path;
   a robot arm with a front end to which the nozzle head can be mounted, and the mounted nozzle head being movable with the robot arm;
   an arm control unit which controls operation of the robot arm;
   a head control unit which controls driving of the nozzles of the nozzle head,
      wherein, in response to the head control unit applying the second driving voltage to the at least one electrode at a corresponding nozzle pressurizing chamber, the second layer expands and causes the volume of the corresponding nozzle pressurizing chamber to reduce and discharge paint from the corresponding nozzle pressuring chamber;
   a distance measuring device which measures distances between a painting portion of the painting object or a component of the painting object and the nozzle discharging surface of the nozzle head; and
   an image processing portion which forms a three-dimensional model for painting, based on a painting coverage of the painting object or the component of the painting object,
   wherein in a state where the operation of the robot arm is being controlled by the arm control unit, the head control unit is configured to control the piezoelectric substrate to discharge paint from the nozzles with distances within a prescribed range, and controls to not discharge paint from the nozzles outside the prescribed range, based on distances measured between painting portions in the three-dimensional model for painting and an imaginary nozzle head for the three-dimensional model for painting.

2. The painting robot of claim 1, wherein:
   the nozzle head is mounted on a mounting structure which is mounted on a tip side of the robot arm, and
   the distance measuring device is mounted on the mounting structure on one side of a main scanning direction when painting by the nozzle head,
   wherein the mounting structure comprises a bracket member mounted in a state where paint can be discharged from the plurality of the nozzles in the nozzle head.

3. The painting robot of claim 2, wherein:
   the arm control unit and the head control unit are configured to perform control based on robot teaching,
   in the robot teaching, the arm control unit is configured to create a painting path which is a scanning path when painting, based on the painting portions in the three-dimensional model for painting or painting portions in the painting object or the component of the painting object,
   in the robot teaching, the arm control unit is configured to create posture data in the painting path for the nozzle head to be at a prescribed inclination angle to the main scanning direction at each position in the painting path, and in the robot teaching, the head control unit is configured to prescribe a paint discharge coverage in which paint is discharged, in a direction orthogonal to the main scanning direction in which the nozzle head scans, based on the painting path and the posture data.

4. The painting robot of claim 3, wherein:
when painting on the painting object or the component of the painting object after the robot teaching, and
based on detection of the painting object or the component of the painting object by a position detection sensor which detects the position of the painting object or the component of the painting object and the distance measuring device, the arm control unit is configured to correct at least one of the painting path, the posture data and the paint discharge coverage created in the robot teaching while controlling the robot arm.

5. The painting robot of claim 1, wherein:
the arm control unit and the head control unit are configured to perform control based on robot teaching, and
in the robot teaching, the arm control unit is configured to create a painting path which is a scanning path when painting, based on the painting portions in the three-dimensional model for painting or painting portions in the painting object or the component of the painting object, and
in the robot teaching, the arm control unit is configured to create posture data in the painting path for the nozzle head to be at a prescribed inclination angle to a main scanning direction at each position in the painting path, and
in the robot teaching, the head control unit is configured to prescribe a paint discharge coverage in which paint is discharged, in a direction orthogonal to a main scanning direction in which the nozzle head scans, based on the painting path and the posture data.

6. The painting robot of claim 5, wherein:
when painting on the painting object or the component of the painting object after the robot teaching, and
based on detection of the painting object or the component of the painting object by a position detection sensor which detects the position of the painting object or the component of the painting object and the distance measuring device, the arm control unit is configured to correct at least one of the painting path, the posture data and the paint discharge coverage created in the robot teaching while controlling the robot arm.

7. The painting robot of claim 1, wherein the robot arm further comprises:
a rotating shaft portion,
a rotating arm,
  wherein the rotating arm is mounted to the rotating shaft portion in a rotatable state, and
a first revolving arm,
  wherein the first revolving arm is mounted to the rotating arm in a revolvable state.

8. The painting robot of claim 7, wherein the robot arm further comprises:
a motor,
  wherein the motor is located in a housing of the robot arm and drives the rotating arm to rotate relative the rotating shaft portion.

9. The painting robot of claim 1, wherein the nozzle head comprises:
a plurality of first nozzle columns located on a first third side of the nozzle head, each of the plurality of first nozzle columns arranged along a main scanning direction.

10. The painting robot of claim 9, wherein the nozzle head further comprises:
a plurality of second nozzle columns located on a fourth side of the nozzle head opposite the third side, each of the plurality of second nozzle columns arranged along the main scanning direction.

11. The painting robot of claim 10, wherein when discharging paint, driving timings are controlled so droplets discharged from the nozzles of the plurality of second nozzle columns drop between droplets discharged from the nozzles of the plurality of first nozzle columns.

12. The painting robot of claim 1,
wherein each of the plurality of nozzle pressurizing chambers connects the at least one supply flow path to the at least one exhaust flow path, and
wherein each of the plurality of nozzles corresponds to the plurality of nozzle pressurizing chambers.

13. The painting robot of claim 1, wherein the at least one supply flow path comprises a plurality of supply flow paths, and the at least one exhaust flow path comprises a plurality of exhaust flow paths,
wherein each of the supply flow paths is arranged in parallel with a respective one of the exhaust flow paths.

14. A painting robot configured to discharge paint towards a painting object from a nozzle to perform painting, comprising:
a nozzle head in which a plurality of the nozzles are arranged in a predetermined direction, the nozzle head comprising:
  at least one supply flow path,
  at least one exhaust flow path, and
  a plurality of nozzle pressurizing chambers, each nozzle pressurizing chamber comprising:
    a nozzle discharging surface defining the nozzle, the nozzle discharging surface defining at least a portion of the nozzle pressurizing chamber, and
    a piezoelectric substrate arranged on a surface of the nozzle pressurizing chamber adjacent a first side of the nozzle head opposite the nozzle pressurizing chamber from the nozzle adjacent a second side of the nozzle head, the piezoelectric substrate comprising:
      a first layer,
      a second layer,
      a first electrode located between the first layer and the second layer, and
      a second electrode located opposite the second layer relative the first electrode, the second electrode configured to apply a driving voltage to the first layer and the second layer,
    wherein, in response to a first driving voltage, the piezoelectric substrate is configured to contract and fill the nozzle pressurizing chamber with paint received from the at least one supply path via a nozzle supply flow path connected to the nozzle pressurizing chamber adjacent the first side of the nozzle head,
    wherein, in response to a second driving voltage, the piezoelectric substrate is configured to expand and discharge the paint in the nozzle pressurizing chamber through the nozzle connected to the nozzle pressurizing chamber adjacent the second side of the nozzle head,
  wherein the plurality of nozzle pressurizing chambers connects the at least one supply flow path to the at least one exhaust flow path, wherein the paint is supplied from the at least one supply flow path to the plurality of nozzle pressurizing chambers to discharge paint from each of the plurality of nozzles and the paint not discharged passes to the at least one exhaust flow path;

a robot arm with a front end to which the nozzle head can be mounted, and the mounted nozzle head being movable with the robot arm;

an arm control unit which controls operation of the robot arm;

a head control unit which controls driving of the nozzles of the nozzle head,
wherein, in response to the head control unit applying the second driving voltage to the second electrode at a corresponding nozzle pressurizing chamber, the second layer expands and causes the volume of the corresponding nozzle pressurizing chamber to reduce and discharge paint from the corresponding nozzle pressuring chamber;

a distance measuring device which measures distances between a painting portion of the painting object or a component of the painting object and the nozzle discharging surface of the nozzle head; and an image processing portion which forms a three-dimensional model for painting, based on a painting coverage of the painting object or the component of the painting object, wherein in a state where the operation of the robot arm is being controlled by the arm control unit, the head control unit is configured to control the piezoelectric substrate to discharge paint from the nozzles with distances within a prescribed range, and controls to not discharge paint from the nozzles outside the prescribed range, based on distances measured between painting portions in the three-dimensional model for painting and an imaginary nozzle head for the three-dimensional model for painting.

15. The painting robot of claim 14, wherein a portion of the first layer sandwiched between the first electrode and the second electrode is polarized in a thickness direction.

16. The painting robot of claim 14, wherein, in response to applying the first and second driving voltages to the second electrode, the first layer is strained due to a piezoelectric effect.

17. The painting robot of claim 16, wherein the second layer expands and reduces the volume of the corresponding nozzle pressurizing chamber in response to the straining of the first layer.

18. A painting method using a painting robot configured to discharge paint towards a painting object from a nozzle to perform painting, comprising:
a nozzle head in which a plurality of the nozzles are arranged in a predetermined direction, the nozzle head comprising:
at least one supply flow path,
at least one exhaust flow path, and
a plurality of nozzle pressurizing chambers, each nozzle pressurizing chamber comprising:
a nozzle discharging surface defining a nozzle, the nozzle discharging surface defining at least a portion of the nozzle pressurizing chamber, and
a piezoelectric substrate arranged on a surface of the nozzle pressurizing chamber adjacent a first side of the nozzle head opposite the nozzle pressurizing chamber from the nozzle adjacent a second side of the nozzle head, the piezoelectric substrate comprising:
a first layer,
a second layer, and
at least one electrode configured to apply a driving voltage to the first layer and the second layer,
wherein, in response to a first driving voltage, the piezoelectric substrate is configured to contract and fill the nozzle pressurizing chamber with paint received from the at least one supply path via a nozzle supply flow path connected to the nozzle pressurizing chamber adjacent the first side of the nozzle head relative to the nozzle pressurizing chamber,
wherein, in response to a second driving voltage, the piezoelectric substrate is configured to expand and discharge the paint in the nozzle pressurizing chamber through the nozzle connected to the nozzle pressurizing chamber adjacent the second side of the nozzle head relative to the nozzle pressurizing chamber,
wherein the plurality of nozzle pressurizing chambers connects the at least one supply flow path to the at least one exhaust flow path,
wherein the paint is supplied from the at least one supply flow path to the plurality of nozzle pressurizing chambers to discharge paint from each of the plurality of nozzles and the paint not discharged passes to the at least one exhaust flow path;

a robot arm with a front end to which the nozzle head can be mounted and moving the mounted nozzle head;

an arm control unit which controls operation of the robot arm;

a head control unit which controls driving of the nozzles of the nozzle head,
wherein, in response to the head control unit applying the second driving voltage to the at least one electrode at a corresponding nozzle pressurizing chamber, the second layer expands and causes the volume of the corresponding nozzle pressurizing chamber to reduce and discharge paint from the corresponding nozzle pressuring chamber;

a distance measuring device which measures a distance between a painting portion of the painting object or a component of the painting object and the nozzle discharging surface of the nozzle head; and an image processing portion which forms a three-dimensional model for painting, which is configured to control driving of the nozzle head by a head control unit, based on a painting coverage of the painting object or the component of the painting object, wherein in a state where the operation of the robot arm is being controlled by the arm control unit, the head control unit is configured to control the piezoelectric substrate to discharge paint from the nozzles with distances within a prescribed range, and controls to not discharge paint from the nozzles outside the prescribed range, based on distances measured between painting portions in the three-dimensional model for painting and an imaginary nozzle head for the three-dimensional model for painting;

wherein the method includes:
an arm operation step in which the robot arm is operated; and
a partial discharge step in which, in the arm operation step, based on the distances measured between painting portions in the three-dimensional model for painting and the imaginary nozzle head for the three-dimensional model for painting or the distances measured by the distance measuring device, performing control to discharge the paint from the nozzles with the distances within the prescribed range, and to not discharge the paint from the nozzles outside the prescribed range.

* * * * *